United States Patent [19]
Kar et al.

[11] Patent Number: 5,006,265
[45] Date of Patent: Apr. 9, 1991

[54] FILTER APPARATUS AND METHOD FOR REMOVING SOLIDS FROM FLUIDS

[75] Inventors: Kishore K. Kar, Midland; David J. Nowak, Auburn, both of Mich.

[73] Assignee: The Dow Chemical Company, Midland, Mich.

[21] Appl. No.: 357,457

[22] Filed: May 25, 1989

[51] Int. Cl.$^5$ ............................................. B01D 25/00
[52] U.S. Cl. .................................... 210/741; 210/106; 210/409; 210/499; 210/779; 210/797; 55/296; 55/489
[58] Field of Search ............... 210/106, 334, 499, 772, 210/779, 791, 793, 797, 741, 409; 55/296, 484, 489, 525

[56] References Cited

U.S. PATENT DOCUMENTS

| | | | |
|---|---|---|---|
| 2,537,323 | 1/1951 | Wurzburger | 210/499 |
| 4,060,483 | 11/1977 | Barzuza | 210/791 |
| 4,564,377 | 1/1986 | Kocatas | 55/489 |
| 4,906,357 | 3/1990 | Drori | 210/334 |

Primary Examiner—Peter Hruskoci
Assistant Examiner—Robert James Popovics
Attorney, Agent, or Firm—V. Dean Clausen

[57] ABSTRACT

The invention is a filter apparatus and method for separating suspended solids from fluids, particularly liquids. A filter chamber is defined inside a filter housing. Inside the chamber is a filter bundle, consisting of two or more filter screens, of a non-woven construction. Spaces between the filter screen strands provide channels for fluid to flow through the filter bundle along a tortuous path that is parallel to each screen. These spaces also define openings for directing a flushing fluid, such as air, in a crosswise direction through the filter screens. The crossflow path of the flushing fluid removes solid particles trapped in the channels of the filter screens.

9 Claims, 7 Drawing Sheets

FILTER APPARATUS AND METHOD FOR REMOVING SOLIDS FROM FLUIDS

BACKGROUND OF THE INVENTION

This invention relates to an apparatus and method for filtering fluids, particularly liquids, to remove suspended solids. More specifically, the invention concerns a filter apparatus in which liquids containing solids flow parallel to the filter screens, the solids are trapped in the screens, and are then removed by a flushing fluid which flows crosswise through the screens.

Filters are generally classified as disposable, or flushable (reusable). The apparatus of this invention utilizes a flushable filter. Backflushing is a common technique used to remove solids that accumulate on flushable filters. In the backflushing step, a fluid, such as air, steam, or a liquid, either with or without surfactants, is passed through the filter media in the reverse direction, to carry the solids away from the filter. But this technique has several drawbacks. For example, it's energy intensive, it's time consuming, and it's an inefficent process. The backflushing step is particularly undesirable from a time standpoint, because it increases the time span of the duty cycle, which is a measure of the total operating time during which filtering occurs. Another disadvantage of this technique is that it adds to the operating cost of a filtering operation.

The reverse osmosis (RO) process is one of the conventional techniques used in desalting sea water to obtain potable water, or commercially usable water. In a typical spiral wound RO module, non-woven screens made of polyethylene or polypropylene are used as spacers between the membranes. These screen members support the membrane and provide a flow path for the sea water to move through the module. The screen members also serve as a static mixer, which induces turbulence in the flowing fluid and thus reduces the concentration polarization. A disadvantage of the screen member spacers, however, is that they trap some of the collodial solids present in the feed water. These particles eventually settle down onto the mem-brane and cause a fouling problem. Attempts to solve the fouling problem led the applicants herein to the present invention.

SUMMARY OF THE INVENTION

The invention is a filter apparatus and method for separating suspended solids from fluids. One embodiment of the filter apparatus includes a filter housing that has a filter chamber defined within the housing. Positioned inside the filter chamber is a filter bundle that includes two or more filter screens. Each screen is constructed of an overlayer strand of material joined to an underlayer strand of material. The strands are placed crosswise to each other and spaced apart, such that the filter screens are of a non-woven construction.

The spaces between the filter screen strands define channels which are oriented in angular relation to each other. These channels allow fluid to flow through the filter bundle along a tortuous path which is parallel to each screen. The spaces between the strands also define openings for directing fluid through the filter bundle in a path crosswise to each screen. A filter disk positioned inside the filter chamber has a holder means along its front face that is designed for holding the filter bundle in place. There are also several flush ports in the filter disk, which extend from the holder means to the rear face of the disk.

The filter apparatus includes a port closure plate having an actuator stem fastened into the rear face of the plate. The actuator stem is, in turn, fastened into an actuator means. The actuator is designed to move the port closure plate to a first position in which it closes the flush ports, and to a second position in which the plate uncovers the ports. The filter housing also includes filter inlet and outlet fittings, and inlet and outlet fittings for a flushing fluid.

In a typical operation of the filter apparatus, a fluid containing solid particles is directed into the filter bundle, through the filter inlet fitting, when the port closure plate is in the first position (flush ports closed). As the fluid moves through the filter bundle, the solid particles are trapped within the channels in the filter screens. After the fluid moves through the filter bundle, it is carried out of the filter chamber through the filter outlet fitting. The solid particles trapped in the filter screens are dislodged by directing a flushing fluid into the filter bundle when the port closure plate is in its second position (flush ports uncovered): and the flushing fluid then carries the particles out of the filter chamber through the flushing fluid outlet fitting.

DESCRIPTION OF THE INVENTION

Figure 1:
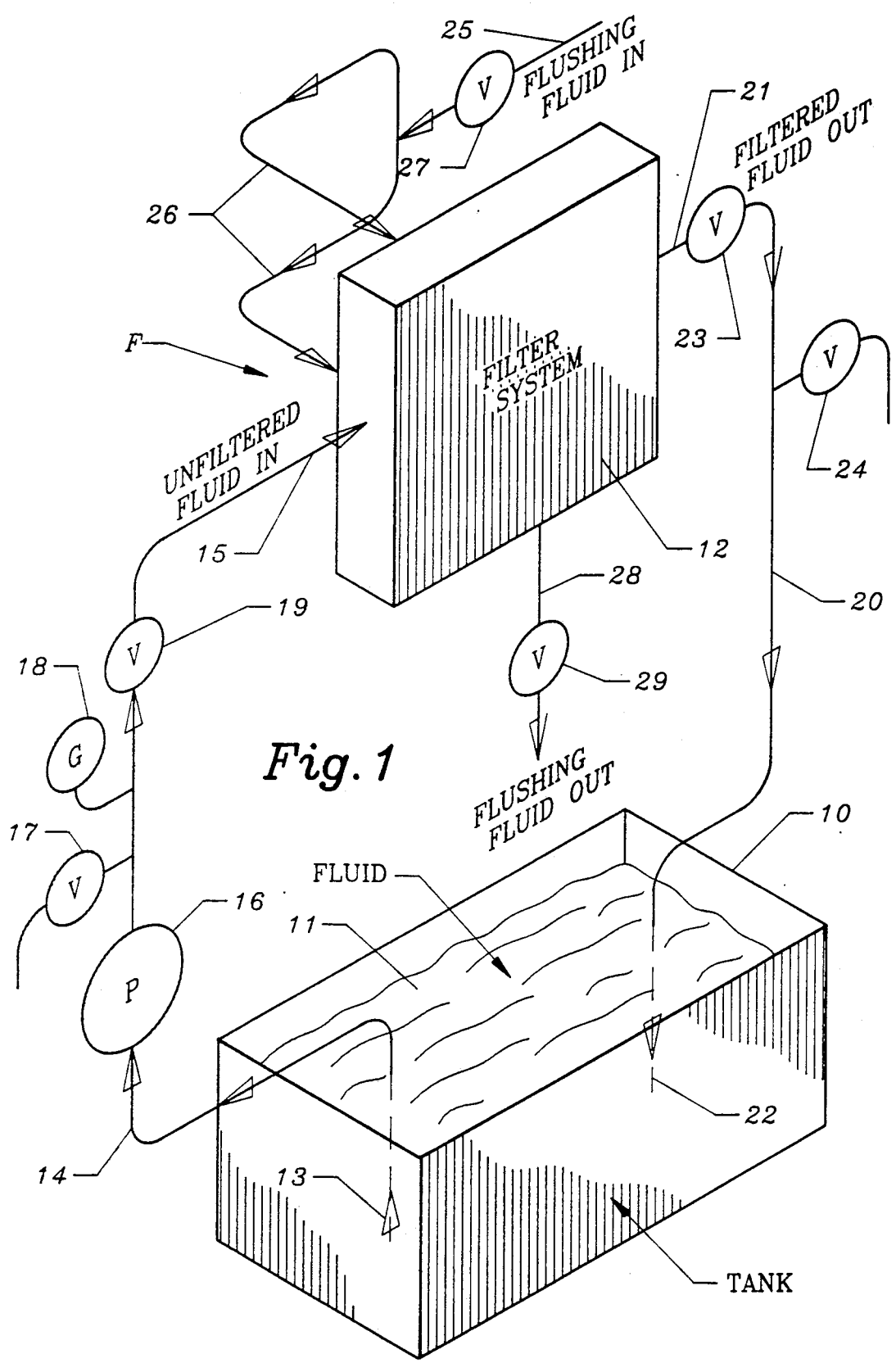
FIG. 1 is a schematic illustration of a filter system according to the practice of this invention.

Referring to the drawings, particularly FIGS. 1 to 6A, the filtering system of this invention is generally indicated by the letter F. As shown in the schematic illustration of FIG. 1, the filtering system includes a tank 10 for holding a liquid 11 that contains suspended particles. Above tank 10 is a filter unit 12 for removing the particles from the liquid medium. The intake end 13 of a delivery line 14 is submerged in the liquid in tank 10, and the outlet end 15 of this line connects into the filter unit.

Installed in line 14 is a pump 16, for pumping the liquid from tank 10 into the filter unit. Other components installed in line 14, between the pump and the filter unit, include an upstream sampling valve 17, a pressure gauge 18, and an upstream shut-off valve 19. After the liquid 11 passes through the filter unit 12, it is carried back into the tank 10 through a return line 20. As illustrated in FIG. 1, the intake end 21 of line 20 connects into the filter unit, and the outlet end 22 of this line is submerged in the liquid 11 in tank 10.

Line 20 also includes a downstream shut-off valve 23 and a downstream sampling valve 24. Means for directing a flushing liquid into the filter unit is provided by a main line 25 and a double-leg line 26, which are connected into the back side of the filter unit 12. Line 25 also includes a shut-off valve 27. The flushing liquid and entrained particles are carried out of the filter unit through a drain line 28, which includes a shut-off valve 29.

The filter unit 12 is made up of several components, as best illustrated in FIGS. 2 to 6A. For example, the main part of unit 12 is a filter housing. The housing consists of a filter body 30, a front cover plate 31, which fastens to the front face of the body, and a rear cover plate 32, which fastens to the rear face of the body. The front and rear cover plates are spaced apart to define a filter chamber 33 inside the housing. Positioned inside the chamber 33 is a filter disk 34, which includes a slot 35 that extends across the front face 34a of the disk.

A filter bundle 36 fits into the slot 35, and is retained in the slot by a keeper strap 37, which is fastened to the front face of the disk by several machine screws 37a. Inside the disk are several spaced-apart flush ports 38 that extend from the floor 35a of the slot to the rear face 34b of the filter disk 34. A port closure plate 39 is located in the filter chamber 33 immediately behind the rear face 34b of the filter disk 34. A flush port gasket 40 is secured to the front face 39a of plate 39, and the front end (not numbered) of an actuator stem 41 is fastened into the rear face 39b of plate 39. The other end of stem 41, indicated by the linkage line 41a, is connected into an actuator means 42, which can move the port closure plate 39 forward or backward. The stem 41 also fits into a guide block 43, and a key 44 on the underside of the stem rides in a keyway (not shown) in the block.

There are several conventional actuator devices 42 that can be used for moving the port closure plate back and forth. A double-acting air cylinder is typical of such a device. As described earlier, the filter housing is made up of the filter body 30, the front cover plate 31, and the rear cover plate 32. On one side of the body 30 is a filter inlet fitting 45 that communicates with the filter chamber 33. On the opposite side of body 30 is a filter outlet fitting 46 that also communicates with chamber 33.

Means for directing a flushing fluid into chamber 33 are provided by flushing fluid inlet fittings 47 and 48, which are installed in the rear cover plate 32. Although two inlet fittings are used for carrying the flushing fluid into chamber 33, this is not a critical requirement; the flushing step could be carried out using only one inlet fitting. The flushing fluid is discharged from chamber 33 through a flushing fluid outlet fitting 49, which is located at the bottom of the filter body 30.

Figure 2:
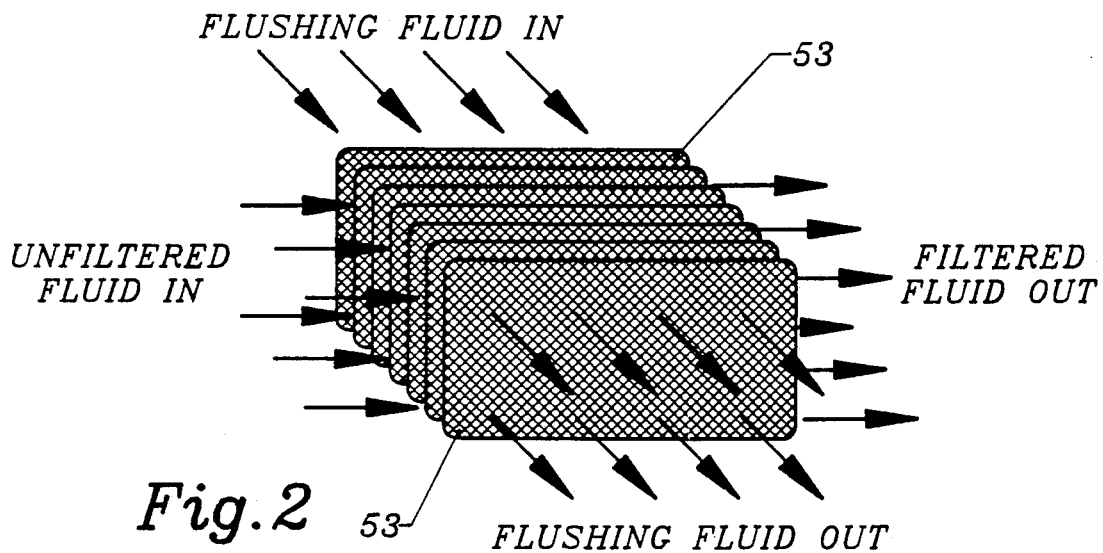
FIG. 2 is a schematic illustration of a filter bundle component of this invention.
Figure 3:
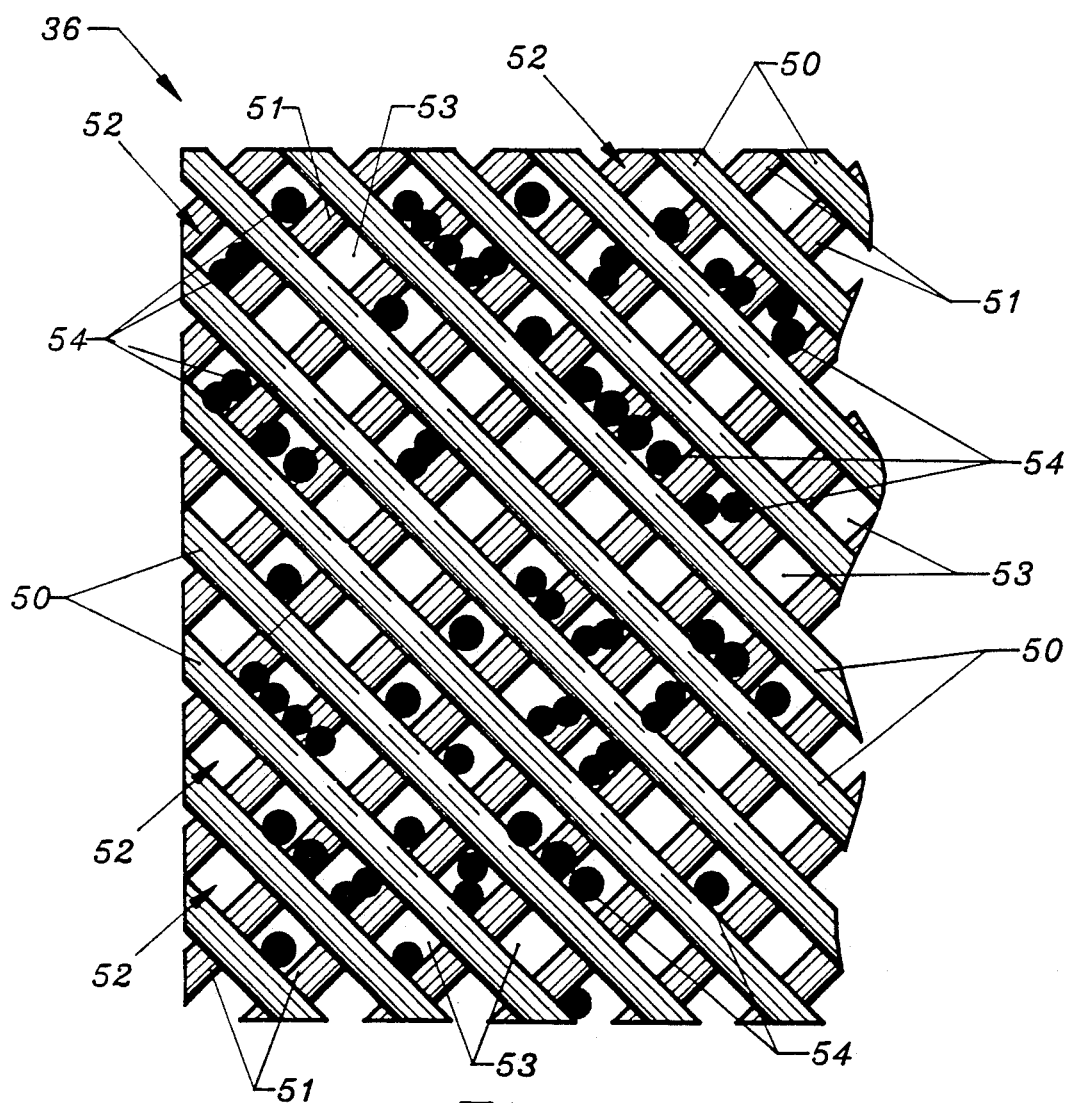
FIG. 3 is an enlarged detail view of a section of one of the filter screens in the filter bundle component shown in FIG. 2.
Figure 4:
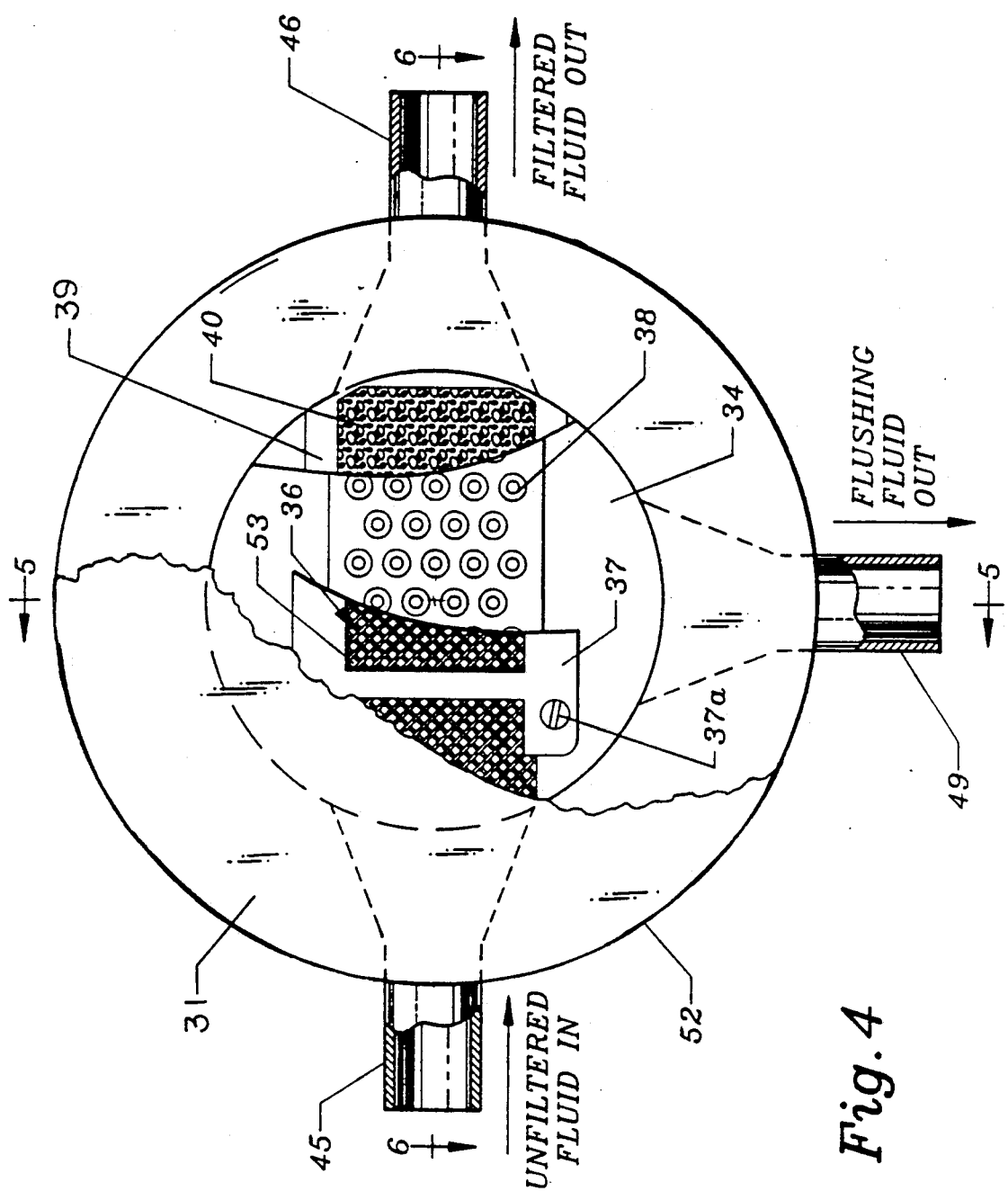
FIG. 4 is a front elevation view, partly in section, of one design of a filter apparatus of this invention.

Referring particularly to FIGS. 2, 3 and 4, the filter bundle 36 consists of several filter screens, with each screen comprising an overlayer strand 50, which is joined to an underlayer strand 51. Both the overlayer and the underlayer strands are spaced apart and positioned crosswise to each other. The spaces between each strand thus define channels 52 that allow fluid to flow through the bundle 36 in a path parallel to each screen (the filtering step). In addition, the spaces between the strands provide openings 53 (FIGS. 2, 3 and 4) that allow fluid to flow through the bundle in a path crosswise to each screen (the flushing step). The drawings also illustrate how the flow channels are oriented in an angular relation to each other (see particularly FIGS. 2 and 4). Therefore, when fluid flows through the channels 52 it moves along a tortuous path, as well as parallel to each filter screen.

OPERATION

The practice of this invention can be illustrated by describing a filtering and flushing operation using the filter apparatus described in FIGS. 1 to 6A. The filter bundle 36 used in this operation consisted of six (6) filter screens. Each screen was made from a conventional screen material sold by the Bemis Company under the name VEXAR ® polypropylene.

The size of each screen was 10 cm. in length ×5 cm. in width x 0.102 cm. in thickness. Each of the underlayer strands 50 and overlayer strands 51 is 0.051 cm. in thickness, which is the actual depth of the channels 52 in each of the filter screens. The total thickness of each screen, which is known as the screen index, is 0.102 cm. The figure is obtained by adding together the thickness of the two strands (0.051×2=0.102). The mesh size of each screen is 0.162 cm., which is the size of the openings 53 in each screen. Since the openings 53 in the filter screens are much larger than the depth of the channels 52, the solid particles 54 trapped in these channels during the filtering step are easily removed during the flushing step.

A solution of water containing a blend of styrene-divinylbenzene copolymer (STVB) beads was prepared for the filtering operation. The sizes of the beads were 300-500 microns, 550 microns (mono beads), and 500-700 microns, and these were made up in 1 gm. quantities. The beads were dispersed in about 30 liters of water 11, contained in tank 10. A few drops of washing soap were added to prevent coagulation. The water in tank 10 was kept at a constant temperature of about 25° C., and it was continuously stirred by two motor-operated stirrers and a baffle plate operated by an electromagnet (the stirrers and baffle plate are not shown). The continuous stirring kept the beads suspended in the water.

Figure 5:
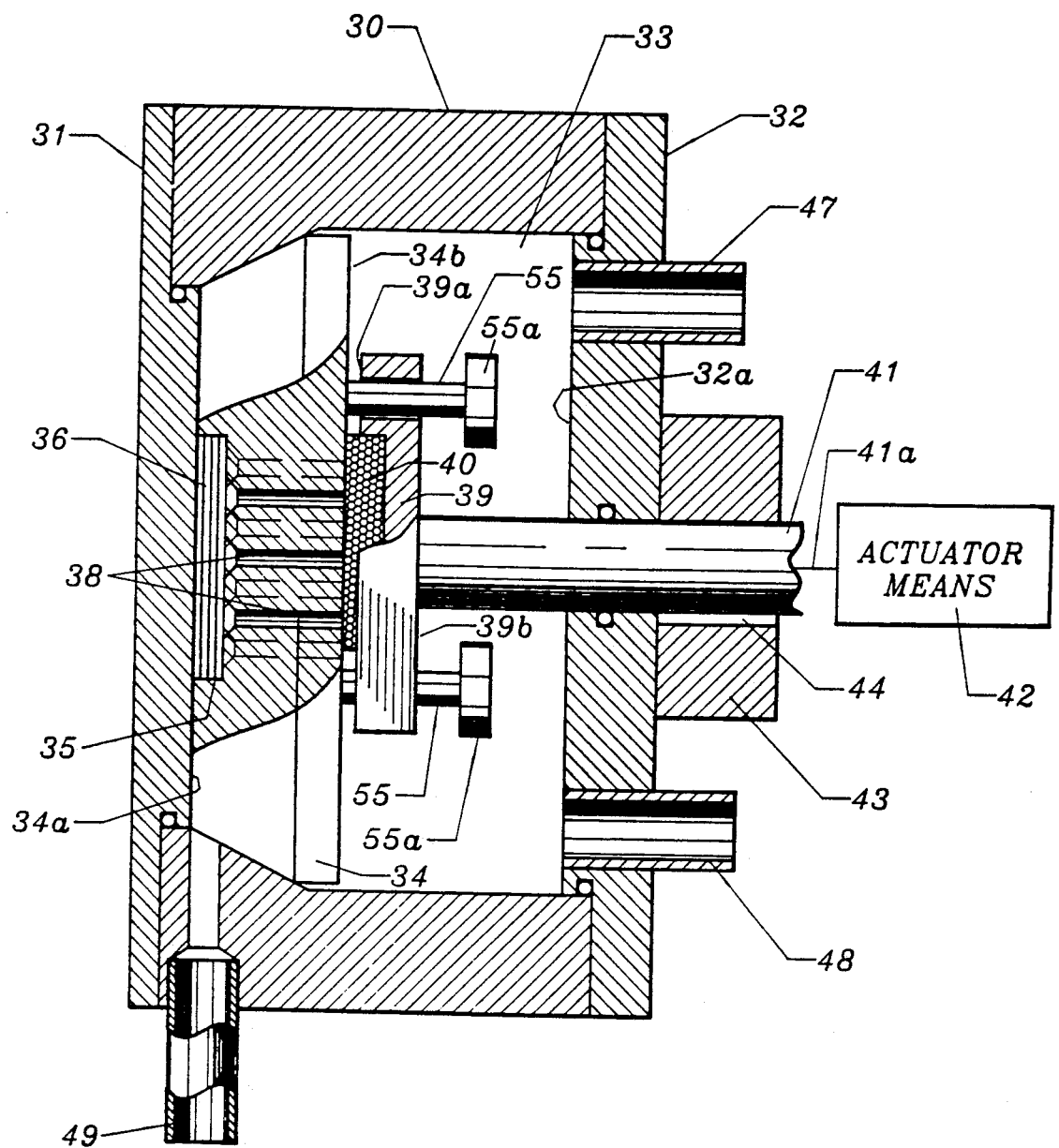
FIG. 5 is another view of the filter apparatus, taken on line 5—5 of FIG. 4. In this view the apparatus is in the filtering mode.
Figure 6:
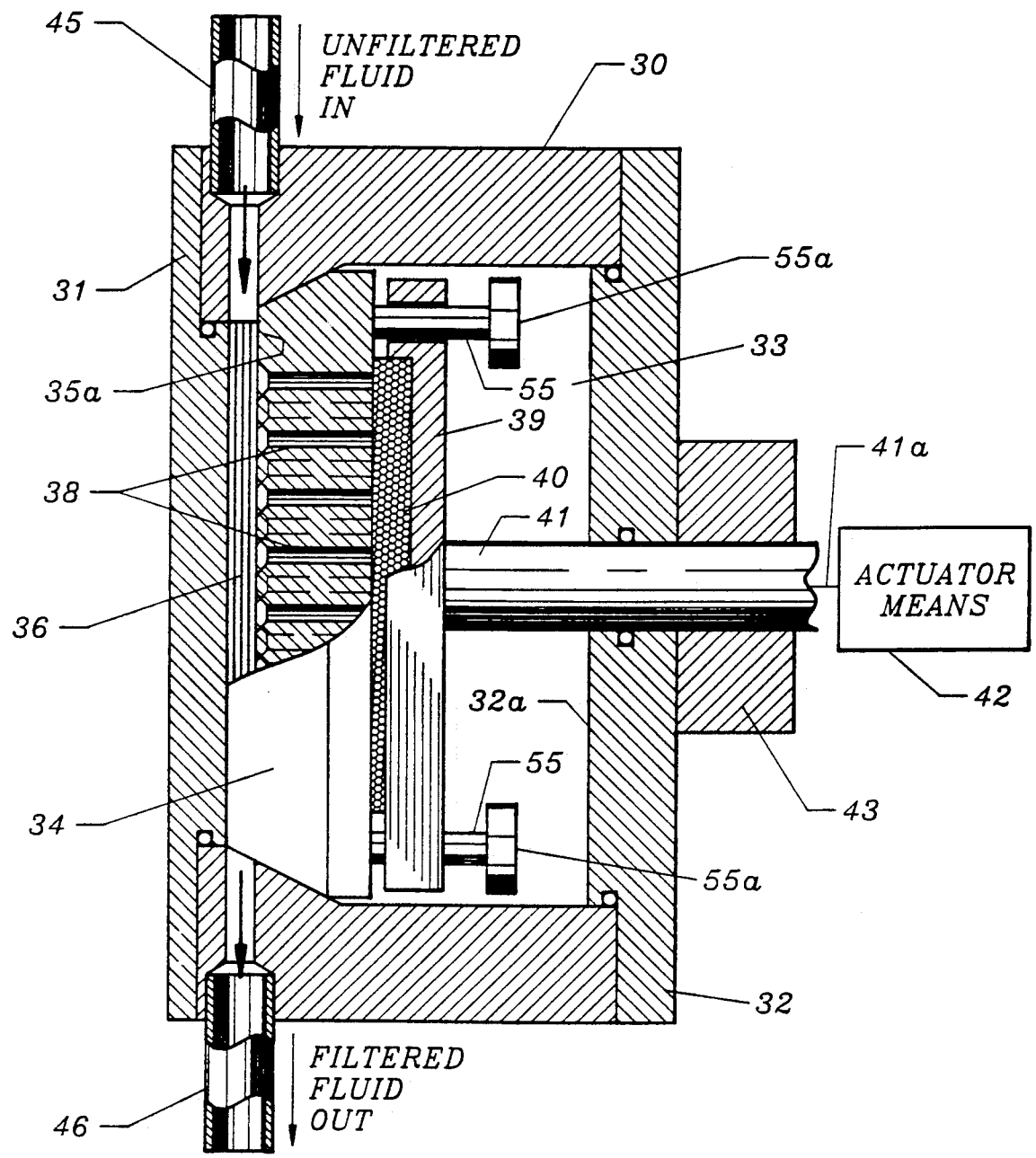
FIG. 6 is another view of the filter apparatus, taken on line 6—6. In this view the apparatus is in the filtering mode.

Pump 16 was started to draw the unfiltered water 11 into delivery line 14 through the intake end 13, and from the delivery line it is carried into the filter unit 12. As illustrated in FIGS. 5 and 6, the filter unit is in the filtering mode when the front face 34 of filter disk 34 is in contact with the front cover plate 31. In this position, the filter bundle 36 is also in contact with the front cover plate 31. From line 14 the unfiltered water 11 passes into the filter bundle through the filter inlet fitting 45 (FIG. 6). When the water moves along the flow channels 52, the STVB beads 54 drop out of the water and lodge in the recesses defined by the flow channels, as shown in FIG. 3.

After passing through the flow channels 52, the filtered water (also indicated by numeral 11) is directed through the filter outlet fitting 46, into return line 20, and back into tank 10 through the outlet end 22. During the filtering operation, the flow rate of the unfiltered water into the filter unit, is varied from about 1.89 to 3.78 liters per minute, and upstream and downstream samples are collected at five (5) minute intervals. The upstream sample is collected by shutting off valve 19 and opening the upstream sampling valve 17. The downstream sample is collected by opening the downstream sampling valve 24. The upstream and downstream samples were analyzed in a conventional particle counter (not shown) to determine the particle (bead) count in each sample.

In the filtering operation the water 11 containing the suspended beads makes several passes through the filter bundle 36, for a total filtering time of about 10 minutes. The particle count data indicated that the size of the particles removed from the water medium is in the range of from about 400 to 600 microns. While the filtering operation is in progress, the operator frequently checks the digital pressure gauge 18, to monitor the pressure drop across the filter unit 12. When the pressure reaches about 0.5 psig, it indicates a build-up of the particles (beads) in the filter bundle 36, which can clog the filter screens if the build-up continues. To avoid the clogging problem, the next step is to flush the particles out of the filter bundle.

To set up for the flushing mode (note particularly FIGS. 5A and 6A), the air cylinder 42 (actuator means) moves the filter disk 34 backward until a set of stop pins 55, which are fastened into the disk, make contact with the inside wall 32a of the rear cover plate 32. The actual point of contact is along the outside surface of the pin heads 55a. The drawings also show that the port closure plate 39 fits over the stop pins 55 and is slidable on the pins. When the heads 55a make contact with wall 32a, the plate 39 slides back until it makes contact with the inside surface of the pin heads 55a.

Moving the port closure plate back against the pin heads 55a uncovers the flush ports 38, and provides a space 56 between the filter bundle 36 and the front cover plate 31. In the practice of this invention air is used as the flushing fluid. The flushing sequence is started by directing the air, at a pressure of about 0.41 mPa, into chamber 33 through the flushing fluid inlet fittings 47 and 48. The pressurized air stream, indicated by the arrows in FIGS. 5A and 6A, moves through the flush ports 38 and on through the openings 53 (see FIGS. 2, 3 and 4) in the screens of the filter bundle 36.

Figure 5A:
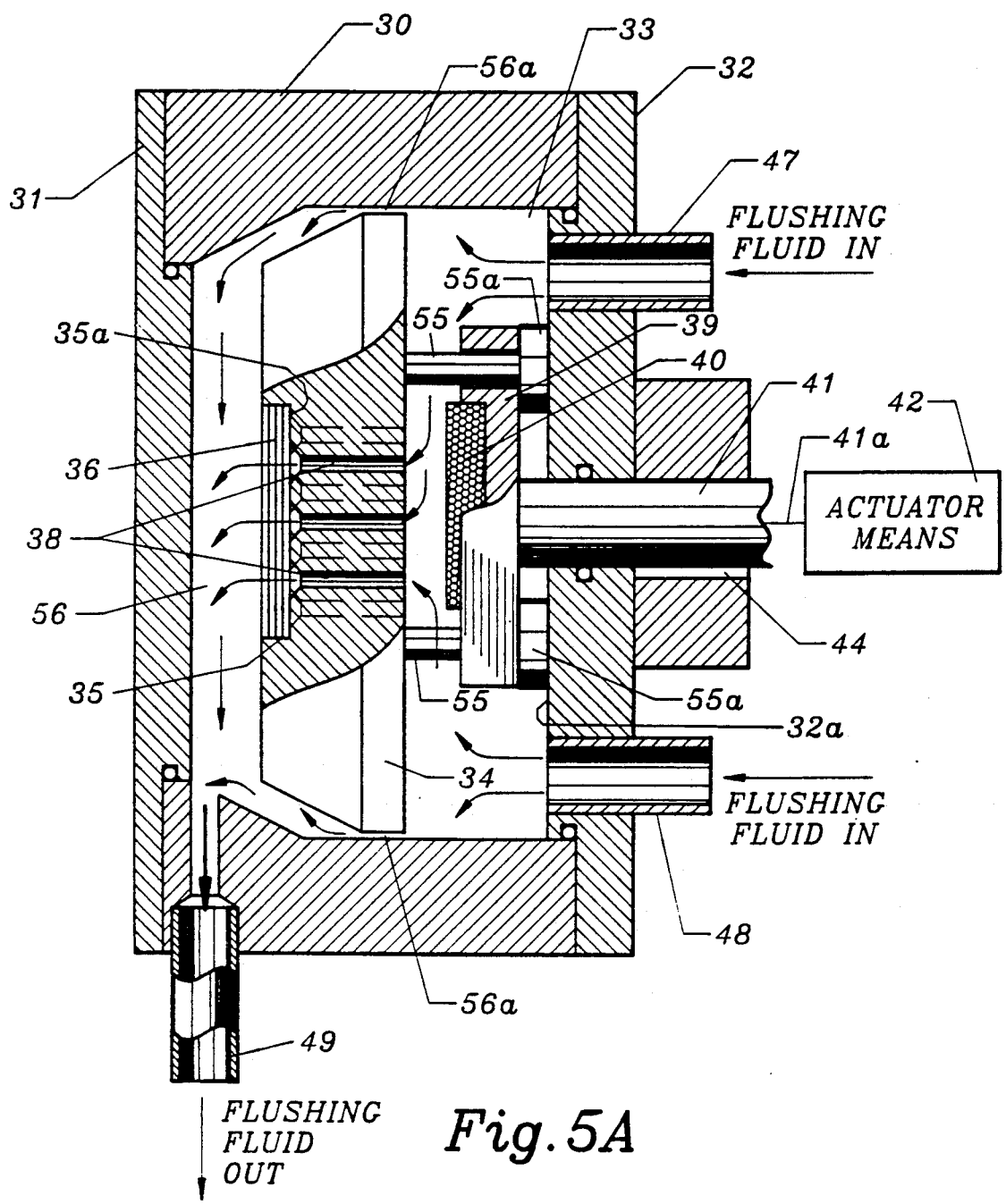
FIG. 5A is another view of the filter apparatus, taken on line 5—5. In this view the apparatus is in the flushing mode.
Figure 6A:
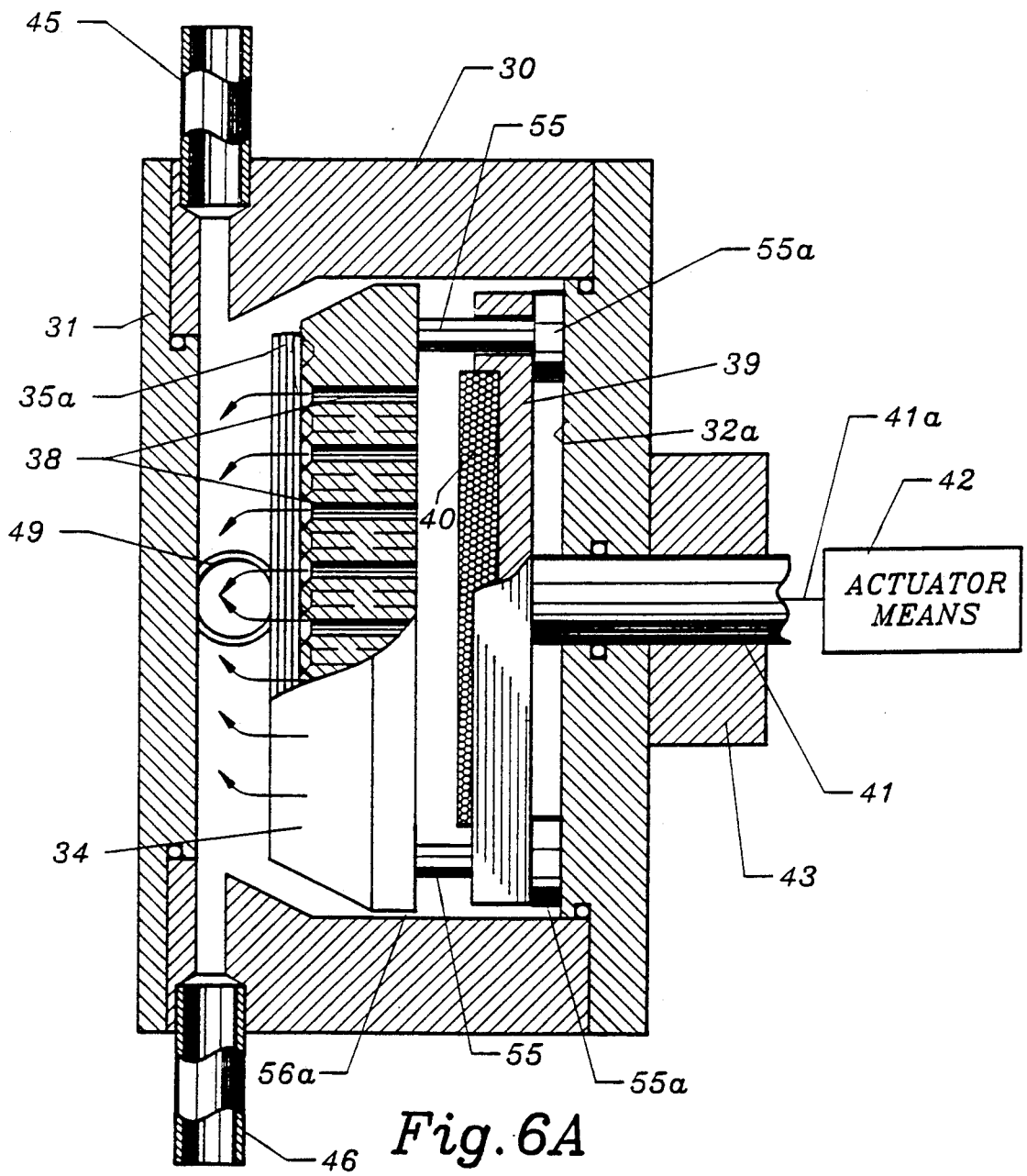
FIG. 6A is another view of the filter apparatus, taken on line 6—6. In this view the apparatus is in the flushing mode.

The path of the air, as it moves through openings 53, is crosswise to the filter screens. The moving air dislodges the particles (beads) 54 (see FIG. 3) from the recesses of the flow channels 52 and directs the particles downwardly through the flushing fluid outlet fitting 49. From fitting 49 the particles are carried to a disposal point (not shown). The total time required for the flushing operation is about (10) seconds. When the filter unit is in the flushing mode, the flushing fluid (air) not only moves through the filter screens in bundle 36, it also passes through a narrow gap 56a between the filter body 30 and the filter disk 34 (FIGS. 5A and 6A). This allows the flushing fluid to act as a cleansing agent in keeping the mating surfaces of the body member and the filter disk clean.

In the practice of this invention, the efficiency of the filtering operation is a function of the velocity of the fluid as it moves through the filter unit 12. In general, it was found that the filtering efficiency increases as the flow velocity decreases. This happens because, at low velocity, there is a greater tendency for the solid particles to be trapped in the filter bundle. An optimum velocity is desireable to achieve a reasonable filtration efficiency. And this is done by changing the dimensions of the filter bundle, so as to increase or decrease the cross-sectional area for the fluid flow. For example, the filter bundle illustrated herein (note particularly FIG. 3) consists of six (6) filter screens. But, using less screens will decrease the cross-sectional area, and using more will increase this area.

In the operation of the present filter unit, the following equation is used to derive a desireable bundle dimension; that is, an appropriate number of screens required for optimum operation of the filter bundle:

$$\frac{\text{Rate of Flow}}{\text{Velocity}} = \frac{\text{Cross-Sectional Opening Area}}{\text{Available for Fluid Flow}}$$

The performance of the filter unit is usually calculated as a filtration ratio, or Beta value. The Beta value is expressed as:

$$\beta_x = \frac{U_x}{D_x}$$

where:
x = particle size (microns)
U = upstream particle count of size > x
D = downstream particle count of size > x The Beta value can also be used to determine the filtering efficiency of the filter unit, which is expressed as:

$$E_R = ((\beta_x - 1)/\beta_x) \times 100\%$$

The Beta values are also a standard method used in the filtering art to report multi-pass efficiency of filter units. For example, in a study of the multi-pass efficiency for the filter unit of this invention, the following test results were obtained:

| Filtering Time (minutes) | Overall $\beta$ | $E_R$ |
| --- | --- | --- |
| 1 | 4.47 | 78 |
| 2 | 7.54 | 87 |
| 3 | 6.29 | 84 |

With regard to the flushing efficiency of the present filter unit, it can be defined as: $\beta$ $$E_F = \frac{P_f}{(P_r + P_f)} \times 100\%$$

where:
$E_f$ = flushing efficiency, %
$P_f$ = number of particles flushed
$P_r$ = number of particles retained in the filter after flushing is completed For example, in the practice of this invention, the overall flushing efficiency was found to be from about 80 to 90%.

As mentioned earlier, when the filter unit is in the flushing mode, the flushing fluid rushes into the filter bundle, as shown in FIG. 5A, and forces the solid particles 54 through the openings 53 (FIGS. 2, 3, and 4). This flushing action is extremely fast, and is usually completed in less than ten (10) seconds. In the operation of the present filter unit, the flow rate(s) of the flushing fluid have no significant effect on flushing performance, unless they are below a certain critical level.

The duty cycle of a filter unit is defined as that fraction of the total operating time in which filtering occurs, expressed as a percentage. This value is calculated as follows:

$$\text{Duty Cycle} = \frac{\text{Feed Time}}{\text{Feed Time} + \text{Flush Time}} \times 100\%$$

In studies of the duty cycle of the present filter unit, we found that it has a distinct advantage over filter devices that are now commercially available. For example, the duty cycle of most conventional filter units is less than 85%. In contrast, our filter unit has a duty cycle that is nearly 100%, as shown in the the following data:

| Feed Time (seconds) | Flush Time (seconds) | Duty Cycle (%) |
| --- | --- | --- |
| 600 | 10 | 98 |
| 900 | 10 | 99 |

The present filter unit also has other advantages over conventional filter systems. For example, the ease with which this filter unit can be flushed gives it a major advantage over other flushable filters. The concept of directing the flushing fluid through the filter bundle in a crossflow path is much more efficient than the backflushing technique that is now common practice. The result is a high duty cycle efficiency that can lower the operating expense considerably.

In a specific application of this unit, it can be used for removing toxic chemicals, or other hazardous substances, from chemical process streams. In other applications, the unit can be used to filter various fluids to remove microorganisms, biomass, gelled substances, and emulsions. The ease of flushing greatly reduces the necessity for scrubbing the process stream, or manual handling of the hazardous materials. The filtering efficiency of the filter unit ranges from about 70-90%, which is a considerable improvement over most of the known reusable filters.

The filter unit can also be used for particle sizing, provided the screen dimensions are optimized to retain a desired particle size, the particle loadings are low, and the size distribution of the particles entering the filter bundle is sufficiently discontinuous. In certain processes, solids are valuable products, and are therefore collected. This filter unit could be used to flush the particles into a container, such as a bag, for storing the product. The filter unit is also readily adaptable to automatic control systems, such as computer controls. For example, it could be programmed to flush automatically in response to pressure drop across the filter bundle.

The invention claimed is:

1. A filter apparatus (F) for separating suspended solids (54a) from fluids, which comprises:
    a filter housing that has a filter chamber (33) defined within the housing;
    a filter bundle (36) positioned inside the filter chamber (33), the bundle including at least two filter screens, each screen being defined by an overlayer strand (50) of material joined to an underlayer strand (51) of material, the overlayer (50) and underlayer strands (51) being spaced apart and placed crosswise to each other;
    the spaces between each strand defining channels (52) which allow fluid to flow through the bundle (30) in a path parallel to each filter screen, and the spaces also defining openings (53) which allow flushing fluid to flow through the bundle in a path crosswise to each screen;
    a filter disk (34) positioned inside the filter chamber (33) and having a front face (34a) and a rear face (34b), the front face (34a) including a holder means (35) for the filter bundle (36), and the disk (34) including several flush ports (38) that extend from the holder means (35) to the rear face (34b) of the disk (34);
    a port closure plate (39) having a front face (39a) and a rear face (39b), and an actuator stem (41) fastened into the rear face (39b) of the plate (39) and into an actuator means (42);
    the actuator means (42) being designed to move the port closure plate (39) to a first position in which the plate (39) closes the flush ports (38), and to a second position in which the plate (39) uncovers the flush ports (38);
    a filter inlet fitting (45), and filter outlet fitting (46), said fittings being positioned in the filter housing, and in communication with the filter chamber (33);
    the filter inlet fitting (45) being designed for directing a fluid containing solid particles (54) into the filter bundle (36) when the port closure plate (39) is in its first position, the filter bundle (36) being designed to trap said particles (54) within the openings (53) in the filter screens as the fluid moves through said filter bundle (36), and the filter outlet fitting (46) being designed to carry said fluid out of the filter chamber (33) after it passes through the filter bundle (36);
    a flushing fluid inlet fitting (47, 48) positioned in the filter housing, and designed for directing a flushing fluid into the filter bundle (36) when the port closure plate (39) is in its second position; and
    wherein the movement of the flushing fluid through the the filter bundle (36) dislodges the solid particles (54) from the filter screens, and the fluid containing said particles (54) is carried out of the filter chamber (33) through a flushing fluid outlet fitting (49) positioned in the filter housing.

2. The apparatus of claim 1 in which the actuator means (42) comprises a double-acting air cylinder, the cylinder having a piston rod which is connected to the actuator stem (41).

3. The apparatus of claim 1 in which the filter disk includes a slot (35) extending across the front face (34a) of the disk (34), the slot (35) providing means for holding the filter bundle in its operating position inside the filter chamber (33).

4. The apparatus of claim 1 in which the filter screens are fabricated of a plastic resin material.

5. The apparatus of claim 1 in which the filter bundle (36) comprises at lest six filter screens.

6. The apparatus of claim 1 in which the fluid flow channels (52) defined between the overlayer strands (50) in each filter screen are oriented in angular relation to the fluid flow channels (52) defined between the underlayer strands (51) in each screen, such that fluid flowing through the filter bundle (36) follows a tortuous path.

7. The apparatus of claim 1 in which there are at least two flushing fluid inlet fittings (47, 48) positioned in the filter housing, each fitting being designed for directing a flushing fluid into the filter bundle (36) when the port closure plate (39) is in its second position.

8. The apparatus of claim 1 in which:
    the filter housing includes a filter body member (30) having a surface that is in contact with a corresponding surface on the filter disk (34), when the port closure plate (39) is in its first position;

a gap (56a) is defined between the body member (30) surface and the filter disk (34) surface, when the port closure plate (39) is in its second position; and the flushing fluid passes through said gap (56a), when the port closure plate (39) is in its second position, to thereby wash and clean the body member (30) surface and the filter disk (34) surface.

9. A method for separating suspended solids (54) from fluids by a filtration operation, which comprises the steps of:

provide a filter housing having a filter chamber (33) defined within the housing;

positioning a filter bundle (36) inside the filter chamber (33);

the filter bundle (36) including at least two filter screens, each screen being defined by an overlayer strand (50) of material joined to an underlayer strand (51) of material, the overlayer (50) and underlayer (51) strands being spaced apart and placed crosswise to each other, the spaces between each strand defining fluid flow channels (52) in the filter bundle (36), and said spaces also defining fluid flow openings (53) in the filter bundle (36);

positioning a filter disk (34) inside the filter chamber (33);

the filter disk (34) having a front face (34a) and a rear face (34b), the front face (34a) including means for holding (35) the filter bundle (36) in place during the filtration operation, and the disk (34) including several flush ports (38) that extend from the holder means (35) to the rear face (34b) thereof;

providing a port closure plate (39), and an actuator means (42) for moving the port closure plate (39) to a first position in which the plate (39) closes the flush ports (38), and to a second position in which the plate (39) uncovers the flush ports (38);

directing a fluid containing solid particles (54) into the filter chamber (33) when the port closure plate (39) is in its first position;

passing the fluid through the flow channels (52) in the filter bundle (36) in a path parallel to each filter screen;

trapping the solid particles (54) within the filter screen openings (53), as the fluid moves through the flow channels (52);

moving the filtered fluid out of the filter chamber (33) after it passes through the filter bundle (36);

measuring the pressure exerted by the fluid being directed into the filter chamber (33), to determine a point at which the solid particles (54) should be removed from the filter bundle (36);

causing the actuator means (42) to move the port closure plate (39) to its second position;

directing a flushing fluid through the filter screen openings (53) to dislodge the solid particles (54) therein; and carrying the flushing fluid containing said particles (54) out of the filter chamber (33).

* * * * *